(12) United States Patent
Tyo et al.

(10) Patent No.: US 8,828,342 B1
(45) Date of Patent: Sep. 9, 2014

(54) DPF ENERGY CONSERVATION

(71) Applicants: Matthew Albert Tyo, Lisle, IL (US); Bradley Jay Adelman, Chicago, IL (US)

(72) Inventors: Matthew Albert Tyo, Lisle, IL (US); Bradley Jay Adelman, Chicago, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/050,846

(22) Filed: Oct. 10, 2013

(51) Int. Cl.
*B01D 53/94* (2006.01)
*F01N 3/10* (2006.01)
*F01N 3/22* (2006.01)
*F01N 3/24* (2006.01)
*F01N 3/20* (2006.01)

(52) U.S. Cl.
CPC .......... *F01N 3/2053* (2013.01); *B01D 53/9495* (2013.01)
USPC ......... 423/213.2; 423/213.7; 60/274; 60/287; 60/288; 60/292; 60/299; 60/301

(58) Field of Classification Search
USPC .............. 423/213.2, 213.7; 60/274, 287, 288, 60/292, 299, 301
See application file for complete search history.

(56) References Cited

U.S. PATENT DOCUMENTS

| | | | | |
|---|---|---|---|---|
| 3,273,971 A | * | 9/1966 | Baddorf et al. | 422/115 |
| 3,791,143 A | * | 2/1974 | Keith et al. | 60/274 |
| 3,896,616 A | * | 7/1975 | Keith et al. | 60/274 |
| 4,485,621 A | * | 12/1984 | Wong et al. | 60/274 |
| 6,089,014 A | * | 7/2000 | Day et al. | 60/274 |
| 7,631,489 B2 | | 12/2009 | Liu | |
| 2006/0185353 A1 | | 8/2006 | Liu | |
| 2012/0198821 A1 | * | 8/2012 | Soukhojak et al. | 60/274 |

* cited by examiner

*Primary Examiner* — Timothy Vanoy
(74) *Attorney, Agent, or Firm* — Jeffrey P. Calfa; Mark C. Bach

(57) ABSTRACT

An exhaust gas treatment system for treating an exhaust gas. The exhaust gas treatment system includes a first section, a bypass section, and a common second section. The first section may include a first valve and at least one exhaust gas treatment component, such as, for example, a DOC and/or DPF. The bypass section may include a bypass valve and a heater that is configured to elevate the temperature of at least a portion of the exhaust gas. The second section is in fluid communication with the first section and the bypass section and includes a selective catalytic reduction system. Further, exhaust gas may be diverted into the bypass section when the exhaust gas fails to satisfy the threshold condition, so that the heater may elevate the temperature of the passing exhaust gas.

15 Claims, 2 Drawing Sheets

DPF ENERGY CONSERVATION

BACKGROUND

Emission standards around the world continue to place stricter limits on emissions from diesel engines, particularly those in over-the-road vehicles, such as trucks. Additionally, thermal management is increasing in importance as greenhouse gas regulations become more stringent. In order to provide consumers with engines that comply with these standards, manufacturers often employ exhaust after treatment systems that are configured to capture pollutants and/or convert pollutants into acceptable emission constituents.

One type of pollutant that after treatment systems may seek to eliminate and/or reduce the quantity present in exhaust gas is nitrogen oxides ($NO_x$). Systems aimed at eliminating and/or reducing the quantity of $NO_x$ may include selective catalytic reduction (SCR) systems. SCR systems typically include an injector that injects a diesel exhaust fluid (DEF) into the exhaust gas. The DEF may be a solution that includes a dissolved reagent, such as, for example, ammonia or urea. The DEF and exhaust gas mixture may then pass through a catalyst in an SCR converter, which reduces NO concentration in the presence of ammonia from the DEF.

The efficiency of the SCR system may be relatively sensitive to the temperature of the incoming exhaust gas. For example, the efficiency of the SCR system may particularly decrease when the temperature of the exhaust temperature entering the SCR system is below a threshold condition, such as below 250° Celsius, and more specifically when the exhaust gas entering the SCR system is around 150° to 250° Celsius. However, during certain engine operating conditions or periods, such as, for example, when the engine is operating under light loads, at low idle, and/or following a cold start, the temperature of the exhaust gas entering into the SCR system may be below a threshold condition for peak SCR efficiency, thereby reducing the ability of the SCR system to convert $NO_x$.

The temperature of the exhaust gas entering into the SCR system may be increased by dosing the exhaust gas, either in-cylinder or in-exhaust gas, with a fuel and combusting the dosed fuel over a catalyst(s) positioned upstream of the SCR system, such as, for example, a diesel oxidation catalyst (DOC) and/or a catalyst(s) in a diesel particulate filter (DPF). However, a relatively significant amount of energy is required to increase the core temperature of these catalysts, which may increase fuel consumption. Further, during light engine loads, such as, for example, during low engine idle conditions, the energy stored in the DOC and DPF may dissipate into the exhaust gas, thus requiring additional energy from the exhaust gas to increase the temperature of the exhaust gas once the engine operating under a higher load.

SUMMARY

Certain embodiments of the present technology provide an exhaust gas treatment system for treating an exhaust gas. The exhaust gas treatment system includes a first section having at least one exhaust gas treatment component. The exhaust gas treatment system also includes a bypass section having a bypass valve and a heater, the heater being downstream of the bypass valve. The heater is configured to elevate the temperature of at least a portion of the exhaust gas. Additionally, the exhaust gas treatment system includes a second section that is in fluid communication with the first section and the bypass section. The second section may include a selective catalytic reduction system. Further, the bypass valve is in a closed position when the exhaust gas satisfies a threshold condition such that the exhaust gas flows through the first section and to the second section. Similarly, the bypass valve is in an open position when the exhaust gas fails to satisfy the threshold condition such that the exhaust gas flows through the bypass section and to the second section. Additionally, according to certain embodiments, the first section includes a first valve that is in an open position when the exhaust gas satisfies the threshold condition and in a closed position when the exhaust gas does not satisfy the threshold condition.

Additionally, certain embodiments of the present technology provide a method for treating an exhaust gas in an after treatment system. The method includes diverting the exhaust gas into a first section of the after treatment system when the exhaust gas satisfies a threshold condition. The first section includes at least one exhaust gas treatment component, such as, for example, a DOC and/or DPF. The method also includes diverting the exhaust gas into a bypass section of the after treatment system when the exhaust gas does not satisfy the threshold condition. The bypass section may include a heater, such as, for example, an electrically heated catalyst, that is configured to elevate the temperature of at least a portion of the exhaust gas. The method further includes delivering the exhaust gas through the first or bypass sections to a second section of the after treatment system that includes a selective catalytic reduction system.

DETAILED DESCRIPTION

Figure 1:
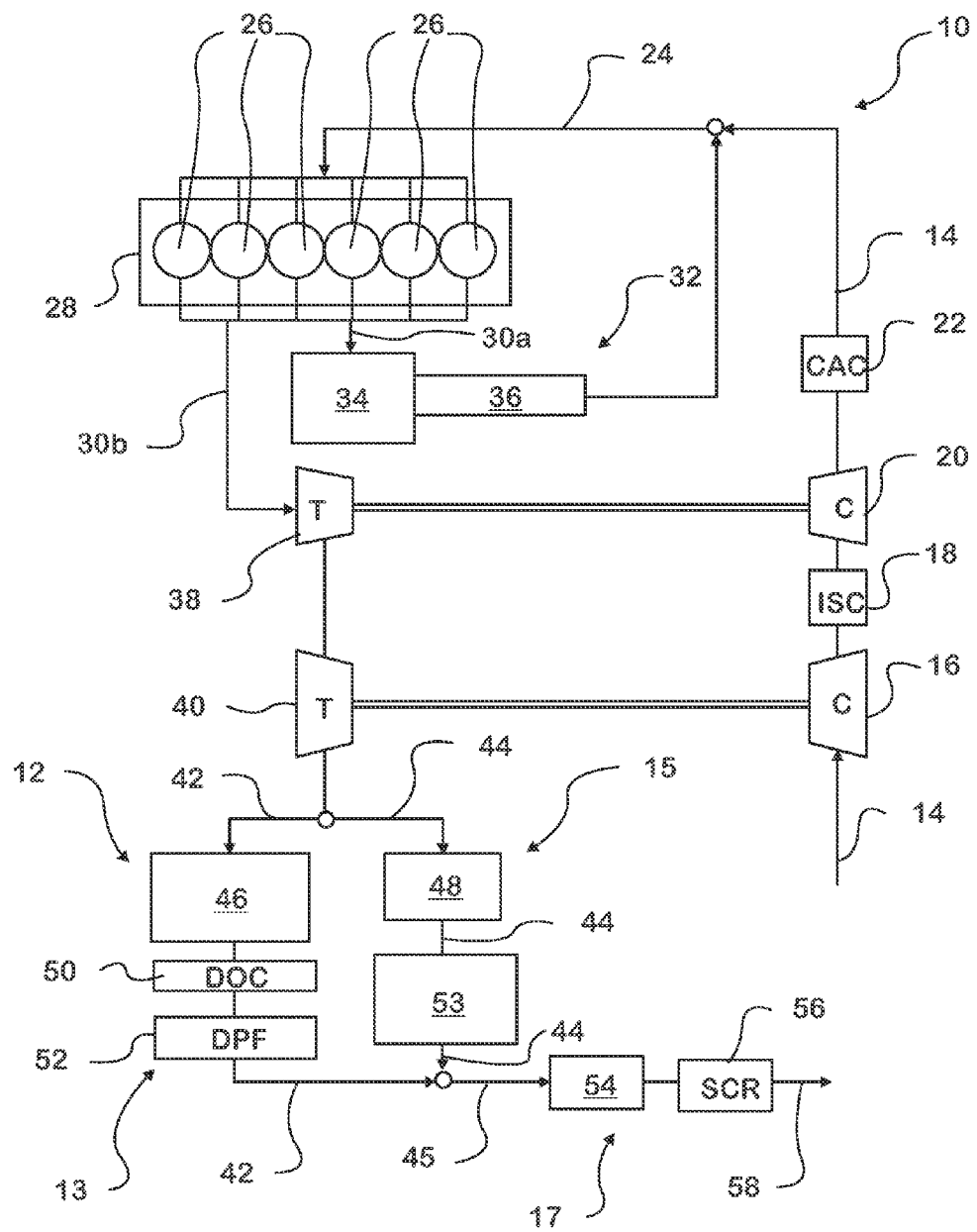
FIG. 1 illustrates a diesel engine system that includes an exhaust gas after treatment system according to an illustrated embodiment.

FIG. 1 illustrates a diesel engine system 10 that includes an exhaust gas after treatment system 12 according to an illustrated embodiment. Although FIG. 1 illustrates a diesel engine system, embodiments of the present technology may also be utilized in a variety of different engine systems, including, for example, engine systems that utilize a gasoline or natural gas. Additionally, while FIG. 1 illustrates a system 10 that utilizes two turbines 38, 40, embodiments of the present technology may be utilized in engine systems having a variety of different configurations, including, for example, engine systems that utilize a single turbine, among others.

According to the embodiment illustrated in FIG. 1, air for use in the operation of the engine system 10, such as, for example, for use during an internal combustion process, may flow along an intake line 14 that includes various hoses and/or tubes. For example, air passes along a first section of the intake line 14 and into a low pressure compressor 16 before flowing along a second portion of the intake line 14 to the interstage cooler 18. The air then flows through a high pressure compressor 20 and high pressure charged air cooler 22 before flowing through another portion of the intake line 14 to an intake manifold 24.

The air may flow through the intake manifold 24 and to cylinders 26 of the engine 28, where the air may be used in a combustion event(s) that is used to displace the pistons of the engine 28, thereby transmitting the force of the combustion event(s) into mechanical power that is used to drive the drivetrain of the associate vehicle. The resulting hot exhaust gas and associated particulate matter, such as soot, produced by or during the combustion event(s) may then flow out of the cylinders 26 and engine 28 through an exhaust port(s) or exhaust manifold 30 and along one or more exhaust lines 30a, 30b.

According to certain embodiments, at least a portion of the hot exhaust gas from the engine 28 may flow through a first exhaust line 30a and be diverted into the EGR system 32 by an exhaust gas recirculation (EGR) valve that is housed in an EGR valve housing 34. The EGR system 32 may be configured to recirculate the diverted exhaust gas back to the intake manifold 30. However, the EGR system 32 may also cool the exhaust gas, such as through the use of an EGR cooler 36 or heat exchanger.

According to certain embodiments, exhaust gas that is not diverted to the EGR system 32 may flow from an exhaust port(s) or exhaust manifold and through a second exhaust line 30b to one or more turbines. For example, according to the embodiment illustrated in FIG. 1, the second exhaust line 30b may deliver exhaust gas to a high pressure turbine 38. The exhaust gas, and the heat entrained therein, may then at least assist in driving the high pressure turbine 38. Power generated by the high pressure turbine 38 may at least in part be used to power or drive the high pressure compressor 20. Exhaust gas exiting the high pressure turbine 38 may then flow along another portion of the exhaust line 30b to a low pressure turbine 40. The low pressure turbine 40 may also be configured to be driven by the exhaust gas, and the heat entrained therein. Additionally, operation of the low pressure turbine 40 may be used to power or drive the low pressure air compressor 16. Exhaust gas exiting the low pressure turbine 40 may then pass through another portion of the exhaust line 30b and into the after treatment system 12.

Figure 2:
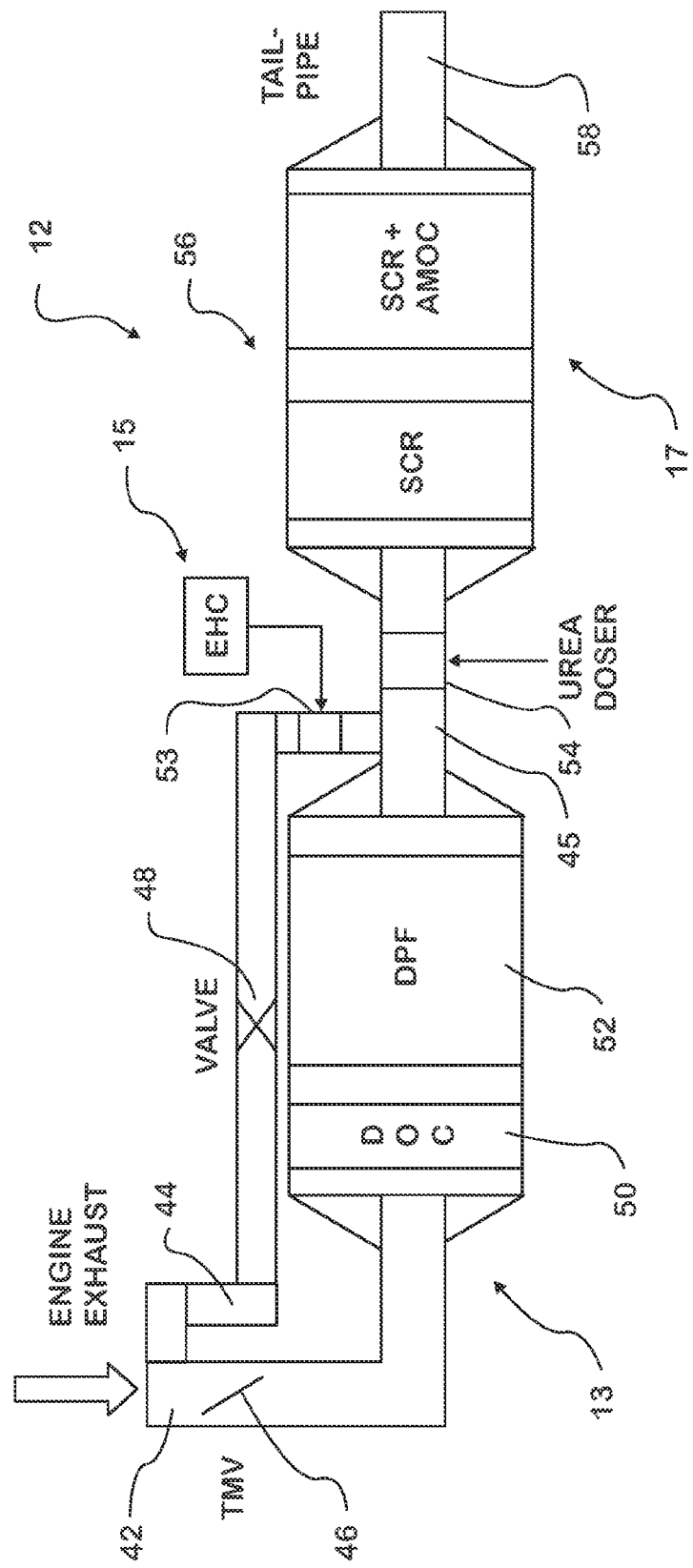
FIG. 2 illustrates a block diagram of an after treatment system according to an illustrated embodiment.

According to certain embodiments, the after treatment system 12 is configured to divert the exhaust to a first section 13 and/or a bypass section 15 of the after treatment system 12. Which section 13, 15 of the after treatment system 12 the exhaust gas is delivered may depend on one or more factors, including, for example, the temperature and/or pressure of the exhaust gas exiting the engine 28, such as at or around the exhaust manifold, and/or the temperature and/or pressure of the exhaust gas entering the after treatment system 12, among other factors. For example, as shown in FIGS. 1 and 2, according to certain embodiments, the first section 13 may include a first passageway 42 and one or more devices used in treating the exhaust gas, such as, for example, a DOC 50 and a DPF 52, among others. Further, according to certain embodiments, the bypass section 15 may include heat source, such as a heater 53, that is used to elevate the temperature of the exhaust gas. For example, in the illustrated embodiment, the bypass section 15 may include an electrically heated catalyst or an electric heater. Exhaust gases that exit the first section 13 and the bypass section 15 may be delivered to a second section 17, which may also include components utilized to treat the exhaust gas, such as, for example, an SCR system 56 and associated fuel doser 54.

According to certain embodiments, differences in flow resistances between the first section 13 and the bypass section 15 may at least partially influenced the flow of exhaust gas into either section 13, 15. More specifically, the presence of one or more exhaust gas treatment components, such as, for example, a DOC 50 and/or a DPF 52, may provide a higher resistance to the flow of exhaust gas into the first section 13 than is provided by the heater 53 of the bypass section 15. Accordingly, as gas may generally flow along the path of least resistance, under such situations, a higher quantity of exhaust gas may flow through the bypass section 15.

However, according to certain embodiments, the quantity of exhaust gas that is able to flow into the bypass section 15, and that is not exposed to the one or more exhaust gas treatment components of the first section 13, may be limited by the use of one or more valves. For example, the bypass section 15 may include a bypass valve 48 that prevents exhaust gas from flowing into the bypass section 15 and/or prevents the exhaust gas from bypassing the one or more exhaust gas treatment components of the first section 13. Further, according to certain embodiments, both the first section 13 and the bypass section 15 may include valves 42, 44. A variety of different valves 46, 48 may be employed, including, for example, thermal management valves, flapper valves, and butterfly valves, among others. Additionally, the type of valve 46 used to control the flow of exhaust gas along the first passageway 42 may or may not be the same type of valve as the bypass valve 48 used to control the flow of exhaust gas along the bypass passageway 44.

According to embodiments in which both the first and bypass sections 42, 44 include valves 42, 44, when the valve 46, 48 of the first passageway 42 or the bypass passageway 44, respectively, is in an open position such that exhaust gas is to flow past the valve 46, 48, the valve 46, 48 of the other of the first passageway 42 or the bypass passageway 44 may be in a closed position so as to at least attempt to prevent the flow of exhaust gas past the closed valve 46, 48. Thus, for example, according to certain embodiments, if the valve 46 of the first passageway 42 is in an open position, the bypass valve 48 of the bypass passageway 44 may be in a closed position. However, according to other embodiments, both valves 46, 48 may be in full and/or partially opened position such that at least a portion of exhaust gas may flow past, and downstream, the valves 46, 48 along the respective passageways 42, 44.

Referencing at least FIG. 2, according to certain embodiments, when the temperature of the exhaust gas satisfies a threshold condition, such as, for example, being around or above 250° Celsius and/or above a predetermined pressure level, among other values, the valve 46 of the first passageway 42 is to be open, and the bypass valve 48 of the bypass passageway 44 is to be in a closed position. The threshold condition may be based on a variety of different factors, including, for example, a threshold temperature for effective treatment of pollutants in the exhaust gas by one more exhaust gas treatment components in either the first and/or common portions 13, 17 of the after treatment system 12, among other factors. For example, in the illustrated embodiment, the threshold condition may be approximately the minimum temperature at with the SCR system 56 in the common portion may effectively convert $NO_x$.

According to certain embodiments, the first section 13 may include one or more exhaust gas treatment components, such as, for example, a DOC 50 and/or a DPF 52, among other components used to treat pollutants in an exhaust gas. In the illustrated embodiment, the DOC 50 may oxidize hydrocarbons and carbon monoxide in the exhaust gas to form carbon dioxide and water. Additionally, according to certain embodiments, a fuel in the exhaust gas may be consumed in the DOC 50, resulting in an exothermic reaction in the DOC 50 that may elevate the temperature of the exhaust gas that will flow downstream to the DPF 52. The DPF 52 may be configured to at least remove particulate matter in the exhaust gas, such as, for example, soot. As shown in FIG. 1, exhaust gas exiting the first section 12 may be delivered to the common portion of the after treatment system 12, such as, for example, a second passageway 45.

Similarly, under certain situations, such as when the exhaust gas does not satisfy or otherwise drops outside of the threshold condition, the valve 46 of the first passageway 42 may be closed and the bypass valve 48 of the bypass passageway 44 may be opened. The exhaust gas may not satisfy the threshold condition based on a variety of different circumstances, such as, for example, during low engine idle conditions or engine start-up when the exhaust gas is below a threshold temperature and/or pressure. With the bypass valve 48 open, exhaust gas entering into the after treatment system 12 may bypass the first section 13 and instead be diverted into the bypass section 15 of the after treatment system 12. Further, although the valve 46 of the first passageway 42 may be closed, in certain situations, the treatment components of the first section 13, such as the DOC 50 and/or DPF 52 may remain warm. For example, hot exhaust gases may have previously flowed through the first section 13, and thereby may have heated the exhaust gas treatment components therein, before a change in operating conditions, such as a drop in engine load or idle speed, that lead to exhaust gas being diverted into the bypass section 15. Additionally, as exhaust gases flows through the bypass section 15 rather than the first section 13, the heated DPF 52 may maintain temperatures that allow the DPF 52 to retain the ability to oxidize soot passively. Further, the flow of exhaust gas through the first section 13, rather than through the bypass section 15, may resume when the exhaust gas resumes satisfying the threshold condition.

According to certain embodiments, a cross sectional size of the bypass passageway 44, such as a diameter, may be relatively smaller than a cross sectional size, such as a diameter, of the first passageway 42. Moreover, the bypass passageway 44 may be configured to use during low exhaust gas flow conditions, and thus experience exhaust flow rates that are typically lower than the exhaust gas flow rates experienced by the first passageway 42.

According to certain embodiments, the bypass section 15 may include a component configured to treat the exhaust gas so that the exhaust gas exiting the bypass section 15 satisfies the threshold condition. For example, according to the illustrated embodiment in which the threshold condition relates to the temperature of the exhaust gas, the bypass section 15 may include a heater 53, such as, for example, an electrically heated catalyst, among others. According to certain embodiments, the heater 53 may be configured to heat the exhaust gas in the bypass section 15 of the after treatment system 12 to a temperature that may improve the efficiency of downstream treatment components to remove pollutants from the exhaust gas. For example, according to certain embodiments, the heater 53 may be an electrically heated catalyst or an electric heater that is configured to elevate the exhaust gas temperature to at least approximately 250° Celsius so as to improve the efficiency of an SCR system 56 in the second section 17 in reducing the level of $NO_x$ in the exhaust gas. Moreover, such a heater 53 may allow the temperature of the exhaust gases to be elevated relatively quickly, which may decrease the time before exhaust gas temperatures reach levels at which the doser 54 is initiated, and thus may increase the conversion efficiency of the SCR system 56. As previously mentioned, according to certain embodiments, the heater 53 may be an electric heater that includes, for example, a metallic substrate, metal foam, or other heat conductor that is heated by a heat source or heat generator, such as, for example, a resistive heater, among other heaters. Additionally, such electric heaters may include a catalytic washcoat such that the heater 53 is an electronically heated catalyst.

The position of the heater 53 may depend on a variety of different considerations, including, for example, the configuration of the bypass passageway 44, installation requirements such as packaging considerations and/or limitations, thermal management when dealing with cold exhaust conditions, and electrical power requirements such as, for example, voltage and current supply limits.

According to certain embodiments, the operation of one or more of the valves 46, 48 and the heater 53 may be controlled by an electronic control unit or module (ECU). For example, the ECU may receive information indicating when the heater 53 is to be activated, such as, for example, information from a sensor(s), such as a temperature, pressure, and/or flow sensor positioned at or near the exhaust manifold, exhaust line 30b, or in the after treatment system 12, among other locations. Such information may also indicate to the ECU whether the bypass valve 48 is to be in an open or closed position. Additionally, although not indicated in FIG. 2, according to certain embodiments, the operation of the valve 46 of the first passageway may also be controlled by the ECU.

Similar to the first section 13, exhaust gas may exit the bypass section 15 and enter into the second section 17, such as, for example, through a second passageway 45. According to the illustrated embodiment, the second passageway 45 may include a doser 54 that may dose a DEF, such as, for example, ammonia or urea, into at least a portion of the passing exhaust gas. The exhaust gas may then enter into the SCR system 56, where the reagent/exhaust gas mixture reacts with one or more catalysts to reduce the $NO_x$ concentration in the exhaust gas. As the exhaust gas exits the after treatment system 12, the exhaust gas may be related to the environment, such as through a tailpipe 58.

The invention claimed is:

1. An exhaust gas treatment system for treating an exhaust gas, the exhaust gas treatment system comprising:
    a first section having at least one exhaust gas treatment component;
    a bypass section having a bypass valve and a heater, the heater being downstream of the bypass valve, the heater being configured to elevate the temperature of at least a portion of the exhaust gas; and
    a second section in fluid communication with the first section and the bypass section, the second section including a selective catalytic reduction system;
    wherein the bypass valve is in a closed position when the exhaust gas satisfies a threshold condition such that the exhaust gas flows through the first section and to the second section, and wherein the bypass valve is in an open position when the exhaust gas does not satisfy the threshold condition such that at least a portion of the exhaust gas in the exhaust gas treatment system flows through the bypass section and to the second section.

2. The exhaust gas treatment system of claim 1, wherein the threshold condition is a temperature of the exhaust gas.

3. The exhaust gas treatment system of claim 2, wherein the first section includes a first valve, the at least one exhaust gas treatment component being positioned downstream of the first valve, and wherein the first valve is in an open position when the exhaust gas satisfies the threshold condition and in a closed position when the exhaust gas does not satisfy the threshold condition.

4. The exhaust gas treatment system of claim 2, wherein the heater is configured to elevate the temperature of the exhaust gas flowing through the bypass section to approximately 250° Celsius.

5. The exhaust gas treatment system of claim 2, wherein the heater is activated when the bypass valve is in the open position and deactivated when the bypass valve is in a closed position.

6. The exhaust gas treatment system of claim 2, wherein the first valve is a thermal management valve.

7. The exhaust gas treatment system of claim 2, wherein the at least one exhaust gas treatment component includes at least one of the following: a diesel oxidation catalyst and a diesel particulate filter.

8. The exhaust gas treatment system of claim 2, wherein the first section includes a first passageway and the bypass section includes bypass passageway, the first passageway having a cross sectional size that is larger than a cross sectional size of the bypass passageway.

9. An method for treating an exhaust gas in an after treatment system, the method comprising:
diverting the exhaust gas into a first section of the after treatment system when the exhaust gas satisfies a threshold condition, the first section including at least one exhaust gas treatment component;
diverting the exhaust gas into a bypass section of the after treatment system when the exhaust gas does not satisfy the threshold condition, the bypass section including a heater that is configured to elevate the temperature of at least a portion of the exhaust gas; and
delivering the exhaust gas through the first or bypass sections to a second section of the after treatment system, the second section including a selective catalytic reduction system.

10. The method of claim 9, wherein the step of diverting the exhaust gas into the first section includes closing a bypass valve of the bypass section.

11. The method of claim 10, wherein the step of diverting the exhaust gas into the bypass section includes opening a bypass valve of the bypass section.

12. The method of claim 11, wherein the step of diverting the exhaust gas into the first section further includes opening a first valve of the first section and wherein the step of diverting the exhaust gas into the bypass section further includes closing the first valve.

13. The method of claim 11, further including heating by the heater the exhaust gas that flows along in the bypass portion.

14. The method of claim 13, further including the step of activating the heater when the bypass valve is in an open position.

15. The method of claim 14, wherein the threshold condition is a temperature of the exhaust gas.

* * * * *